Patented Feb. 25, 1947

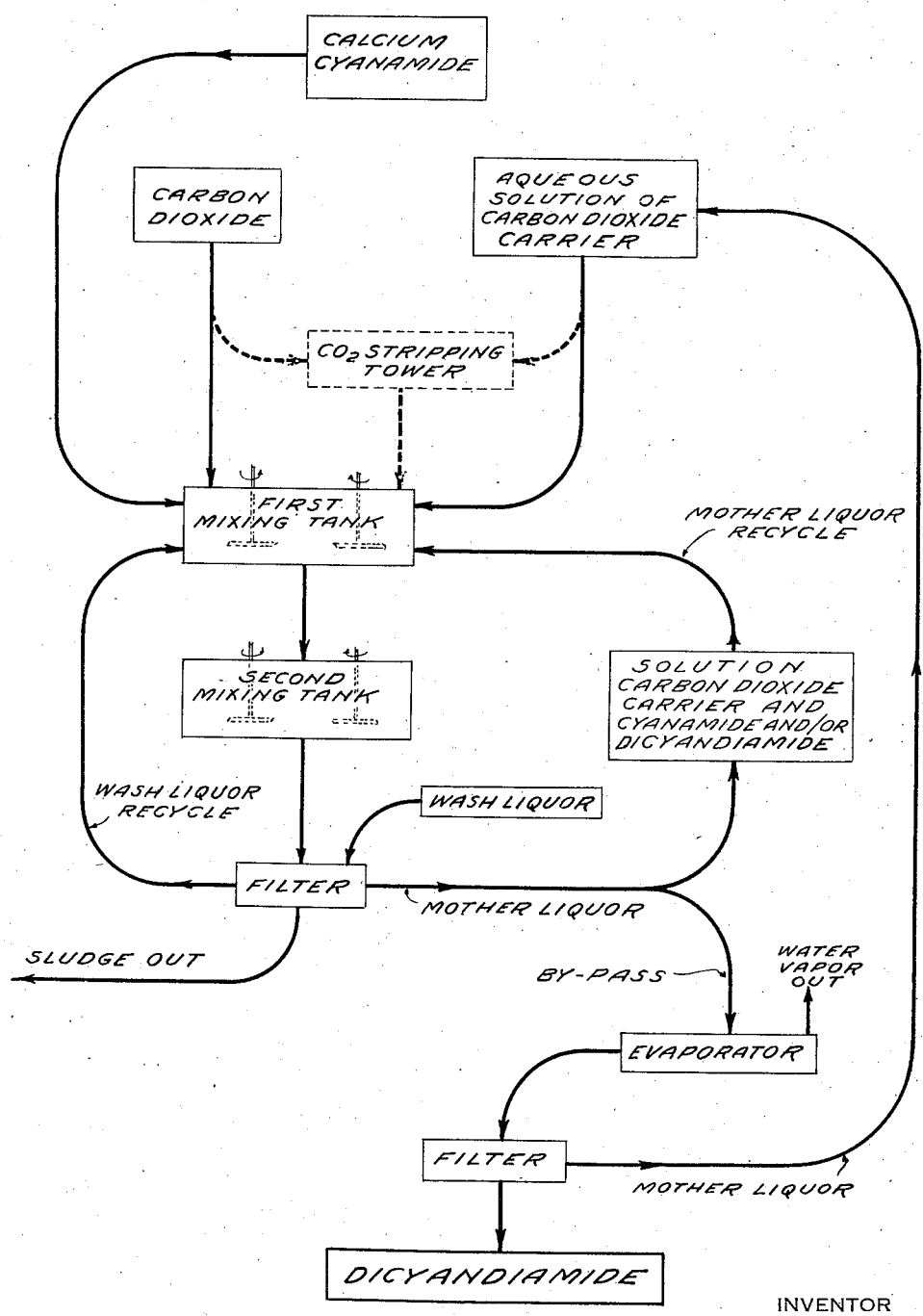

2,416,544

UNITED STATES PATENT OFFICE 2,416,544

METHOD OF PREPARING DICYANDIAMIDE

John L. Osborne, Elizabeth, N. J., assignor to American Cyanamid Company, New York, N. Y., a corporation of Maine Application December 19, 1944, Serial No. 568,894

4 Claims. (Cl. 23—190)

This invention relates to a process of preparing dicyandiamide from crude calcium cyanamide.

The principal object of the present invention is to prepare dicyandiamide by polymerizing cyanamide obtained from crude calcium cyanamide in an efficient manner and in good yields and purity, while suppressing the formation of undesirable by-products.

An important adjunct of the invention resides in facilitating contact between a gaseous precipitant such as $CO_2$ with calcium cyanamide such as by use of what may be termed a "$CO_2$ carrier," that is, by the use of a material which will react with $CO_2$ and the resulting carbonate or bicarbonate go into solution, where it will then readily react with $CaCN_2$. Such a situation makes possible a better contact of the gaseous precipitation agent with the calcium cyanamide than if such agent were used strictly in gaseous form, and consequently can result in a saving of up to 25% of the $CO_2$.

In patent application Serial No. 568,892 it is proposed to carry out a process substantially identical with that of the present application employing the alkali carbonates as the $CO_2$ carrier. In Serial No. 568,893 methyl- and ethylamines are employed, and in Serial No. 568,895 the ethanolamines are employed.

Heretofore, as disclosed in the prior art, carbon dioxide has been used to precipitate calcium carbonate from aqueous slurries of crude calcium cyanamide. However, such processes involve, essentially, gaseous-liquid reactions. When pure carbon dioxide is used, such reactions necessitate bulky, expensive and unusually complex mixing and diffusion apparatus in order to comminute the carbon dioxide bubbles and effect a better contact of the carbon dioxide and liquid solvent. When stack gases are used as a source of carbon dioxide in these prior processes, the disadvantages become still greater, for then the use of gaseous-liquid reactions in the preparation of cyanamide and dicyandiamide necessitates the processing of large volumes of gases. This requires unusually large, bulky equipment and necessitates treatment over extended time intervals. The operation of such processes as disclosed in the prior art is accordingly quite inefficient, principally because of the low solubility of carbon dioxide in water. Furthermore, these prior processes also fail to overcome the disadvantages attendant upon the low solubility of lime and calcium cyanamide in the water used to make up the aqueous slurry.

The present process involves a novel method of facilitating the reaction between carbon dioxide and crude calcium cyanamide slurries. It relates to a simple process for bringing about the better solution of carbon dioxide in the water forming the slurry. Thus, it has been found that by the addition of a suitable water soluble compound capable of carrying carbon dioxide in combination there is effected what is essentially a marked increase in the solubility of carbon dioxide. Furthermore the reaction of $CO_2$ and calcium cyanamide is completed more efficiently. This is due to the fact that the process is effected as a liquid to liquid rather than as a gas to liquid type of reaction. The solubilizing of the carbon dioxide converts the latter into a more readily available condition, diffused throughout the liquid, and hence effects the reaction as one closely approximating an ideal liquid to liquid type of contact.

These novel features in the process of the present invention make possible the use of smaller, less complicated apparatus. The present process also shortens the time necessary to complete the reaction of carbon dioxide with the lime and the $CaCN_2$. At the same time it makes possible the use of lower pressures of carbon dioxide while effecting a greater concentration of carbon dioxide in solution. This results in a more efficient process and a more uniform quality of product. Among the compounds capable of reacting in this manner are the following: the alkali metal carbonates, such as sodium and potassium carbonate, guanidine and guanylurea both as such and as their carbonates, the ethanolamines such as the mono, di and tri forms, and also the alkyl amines such as the mono and poly methyl and ethyl amines.

More specifically, in accordance with one embodiment of this invention, it is proposed that guanylurea or its carbonate be dissolved in the liquor used to extract cyanamide from the crude calcium cyanamide slurry and that carbon dioxide be passed into the resultant slurry. It will be found that the carrier serves to dissolve $CO_2$ and react therewith, and also accelerate the formation of calcium carbonate. The carrier in the form of the bicarbonate reacts with the calcium of the crude calcium cyanamide. It also reacts with the lime which is present in the slurry as calcium hydroxide. This reforms the carrier carbonate and a precipitate of calcium carbonate. The carrier solution formed adsorbs additional carbon dioxide at a very rapid rate, reforming guanylurea bicarbonate which then reacts with the calcium acid cyanamide in the extraction liquor. This yields calcium carbonate as a precipitate and free cyanamide. This solution may be then concentrated as by evaporation, and any cyanamide therein not already polymerized, polymerizes to form dicyandiamide which is readily extracted by filtration.

It is to be noted that the use of the process of this invention not only makes possible a greater concentration of carbon dioxide in the slurry but also results in the presence of carbon dioxide in a more readily reacting form than the usual gaseous state. This is due to the addition to the slurry of the above mentioned compounds. All of these compounds have a high affinity for carbon dioxide which is held in combination therewith. Hence these are capable of serving as carriers of carbon dioxide held in combination and readily available for further reaction as with the calcium of the slurry. These compounds make possible a more complete absorption and solution of carbon dioxide in the mother liquor than could be effected if the carbon dioxide were bubbled through a slurry containing no such carrier compounds. Furthermore with these compounds present, the carbon dioxide need be under little or no pressure in order to obtain a high concentration of available carbon dioxide. Heretofore equally high concentrations of carbon dioxide could be attained only by using carbon dioxide under several atmospheres pressure. Because of the low pressure solubilizing step characteristic of the process of this invention, it is unnecessary to carry out the process in such expensive air-tight autoclaves and pressure vessels as heretofore used.

The accompanying flow sheet diagrammatically illustrates a preferred embodiment of the invention. As shown, a quantity of an aqueous solution of the carbon dioxide carrier and crude calcium cyanamide in proper proportions and concentrations is worked up into a slurry with water, or with a recycled portion of the mother or wash liquor from a previous batch. The mixing tank is heated or cooled in order to maintain the temperature within optimum limits so as to obtain desirable yields and avoid excessive decomposition due to side reactions which result in the production of $NH_3$, urea and the like. The slurry may be prepared in an atmosphere of carbon dioxide under superatmospheric pressure in an autoclave or, alternatively, carbon dioxide is bubbled through the slurry at atmospheric pressure. The reactants are mixed, preferably, for an additional time interval in a second tank to increase the extraction of the calcium cyanamide after which the slurry is filtered. In order to increase the concentration of nitrogen present in the form of cyanamide and later as dicyandiamide, the mother liquor forming the clear filtrate is recycled a number of times and reslurried with additional portions of crude calcium cyanamide, the combined recycled mixture being then finally filtered. When the mother liquor attains its optimum concentration of cyanamide or dicyandiamide it is withdrawn through the by-pass for further treatment. After a predetermined number of recycling steps including the reslurrying of the filter cake, the filter cake remaining as a sludge in the final filtration step is washed with a small amount of wash liquor in order to remove the greater portion of the entrained carbon dioxide carrier left therein. This wash liquor is recycled to form an aliquot part of a new batch or slurry of calcium cyanamide. The sludge remaining in the filter is removed from the system by scraping the filter plates clean of the spent sludge. A new slurry is then prepared as above described, the cycling and recycling steps are carried out again terminating in a final filtration and removal from the extraction cycle of the mother liquor containing its optimum concentration of cyanamide and high in dicyandiamide or the reverse. The former situation is a highly desirable one inasmuch as by building up the content of dicyandiamide in the mother liquor, that is, by polymerization of the cyanamide to dicyandiamide, as the former is freed from calcium cyanamide, the liquor going through the by-pass will contain more and more dicyandiamide making evaporation at this stage unnecessary. That dicyandiamide can be built up in the mother liquor will be apparent when it is considered that the liquor at this stage is of sufficiently high alkalinity and temperature to facilitate polymerization of the cyanamide to dicyandiamide. This situation will be more fully discussed hereinafter.

In addition to the above batch process, the process can be readily effected by continuously drawing off a fractional part of the mother liquor or concentrate through the by-pass for further special treatment. The remaining portion is returned or recycled to the first tank where more crude calcium cyanamide and carbon dioxide as well as wash liquor and mother liquor from other sources, as shown, can be added to maintain the recycling volume constant.

The mother liquor withdrawn through the by-pass may be concentrated in an evaporator, preferably by low temperature vacuum distillation, to remove the excess water. The carbon dioxide held in combination by the carrier is simultaneously evolved with the result that the alkalinity of the solution may be increased to that of a solution having a pH of 11.0 or thereabouts, whereupon practically all of the cyanamide polymerizes to dicyandiamide. The dicyandiamide, containing perhaps a small amount of cyanamide in the entrained liquor, is readily separated out by cooling and filtering the solution. The mother liquor forming the filtrate is recycled as shown to form a new slurry. If contaminated unduly with decomposition products, such as urea for example, it may be preferable to discard this filtrate periodically.

When vacuum evaporation of the by-passed mother liquor is conducted at a low temperature, i. e., about 30° C. to 35° C., most of the cyanamide present polymerizes to form dicyandiamide due to the high alkalinity of the solution. Any remaining free cyanamide subsequently polymerizes on storage. However, if complete conversion of the cyanamide to dicyandiamide is desired immediately, the evaporation step may be omitted, particularly if the solution is stronger than about 10 or 12%. Thus, if the solution has a concentration of 15% or higher, it is not necessary to evaporate it further. Instead polymerization can be carried out by a carefully controlled heating step here which effects a 100% conversion of the cyanamide to dicyandiamide. The dicyandiamide separates out in crystalline form and is easily collected by cooling the liquor and filtering as above described.

In connection with the building up of dicyandiamide in the mother liquor at the expense of the cyanamide, and prior to by-passing the mother liquor to the recovery system as above set forth, the following is an important consideration.

It would of course be desirable to operate the cycle under such conditions that most, if not all, of the cyanamide went directly to dicyandiamide reasonably as fast as the cyanamide was free, maintaining enough water in the system to keep the dicyanadiamide in solution so that when the final liquor reached the evaporator the dicyandiamide could be recovered therefrom either by evaporation or chilling or both.

The above may be readily accomplished by maintaining the pH of the system at 7.0 or above. While high temperatures are desirable in order to increase the rate of polymerization of cyanamide to dicyandiamide, yet the temperature is not as important as the pH.

It will be apparent that as the calcium cyanamide is fed to the mixing tank the pH has a tendency to rise, whereas when the $CO_2$ is fed to the mixing tank the pH has a tendency to fall. Thus, it is a simple matter, by judicious control of these two reactants, to maintain the pH between 7.0 and 12.0 so as to maintain desirable cyanamide polymerizing conditions. This can be very simply accomplished by keeping the calcium cyanamide feed ahead of the carbon dioxide feed. The temperature of the extraction cycle may be maintained at from 30° C. to boiling, the exact figure depending upon the existing pH. For a given pH within the desired range, the higher the temperature, the faster the polymerization. At the same time, if operating conditions require a stated temperature, the pH may be adjusted accordingly.

For instance, where the temperature of the reaction mass is 50° C. cyanamide may be readily converted to dicyandiamide at a pH of 9.6 while at higher temperature such as 80° C. the optimum pH is about 9. At boiling temperatures the pH may drop as low as 8 while still obtaining polymerization of cyanamide to dicyandiamide at good rates.

The increase in temperature to increase the rate of polymerization can be very easily accomplished where flue gases are used as a source of carbon dioxide since such gas as discharged from a boiler plant will generally be at a temperature of 204° C. or higher. Thus the sensible heat of such gases may be used to raise the temperature of the reaction mass and to supplement if necessary the heat evolved there. In the event that the temperature in the mixing tank tends to rise to undue heights, this can be readily controlled by proper cooling of the stack gases. Inasmuch as such gases contain carbon dioxide generally to the extent of about 12%, the other constituents being in the nature of diluents, a large volume of gas may be passed through the magma in the mixing tank so as to accurately control the temperature desired there.

Generally speaking, optimum quantities of cyanamide may be released from a calcium cyanamide slurry in the presence of $CO_2$ where the pH is maintained no lower than 7.0 and preferably from 8.0 to 11 or slightly higher with a temperature of from 30° C. to boiling. A rise in temperature for any given pH will, of course, increase the speed of polymerization and as the temperature rises the pH may be decreased toward 7.0 while still maintaining the same polymerization rate. Under these circumstances, it is desirable to maintain sufficient water in the system to keep all of the dicyanamide formed in solution plus a slight excess so that there will be no loss of dicyandiamide values during the normal and expected temperature drop of the mother liquor as it passes through the filter.

Thus it is entirely possible to maintain the cycle under such conditions of pH and temperature that there will be little or no cyanamide going through the by-pass but on the contrary this by-passed mother liquor will be almost exclusively a desirably high concentration of aqueous dicyandiamide solution containing a minimum quantity of undesirable decomposition products such as urea. Under these circumstances, a simple evaporation and/or chilling will precipitate dicyandiamide from such clear solutions in good purity which may be filtered from the mother liquor and recovered as such. The mother liquor from the dicyandiamide recovery system may then be returned to the cycle as indicated.

Only a small amount of the carrier is lost from the system by failure to wash the first filter cake. Another small portion of the carrier may be lost by failure to wash the final filter cake. However, by flushing these filter cakes with wash water the carrier therein is easily removed. Thus, the entrained carrier may be removed from the final product by washing it out of the filter cake with a small portion of water and simultaneously leaving the relatively insoluble dicyandiamide on the filter. Hence it is unnecessary to renew the entire supply of the carrier for each extraction. Instead, the addition of a small portion of the carrier or an aqueous solution thereof to the recycled mother liquor at intervals during the process or after each extraction cycle is ample to increase the concentration of the carrier in the mother liquor sufficiently for effective re-use upon further addition of carbon dioxide.

Due to the inclusion of a filter in the extraction and/or conversion cycle, the solids are being continuously removed. Thus any desirable concentration of solubles up to and just short of saturation in the liquor for any desirable working temperature may be had without making the recycle magma unhandleable due to solids.

The reactions involved may be briefly represented by the following equations when sodium carbonate is used as the carbon dioxide carrier:

$$Na_2CO_3 + CO_2 + H_2O = 2NaHCO_3$$

The sodium bicarbonate formed serves as a highly accessible source of carbon dioxide and reacts with the crude calcium cyanamide to precipitate calcium carbonate as follows:

$$CaCN_2 + 2NaHCO_3 = CaCO_3 + H_2CN_2 + Na_2CO_3$$

Sodium carbonate is thus reformed and is in condition to react immediately with the incoming carbon dioxide to give the bicarbonate and continue the precipitation of more calcium.

The corresponding equations occur when potassium carbonate, guanidine, guanylurea, either added as such or used as the carbonate, ethanolamine such as mono, di or tri ethanolamine, mono, di or tri methyl or ethyl amine, and the like, are used as the carbon dioxide carrier.

The following examples are given to more clearly illustrate the process involved.

*Example 1*

1000 parts of water, 250 parts of crude calcium cyanamide and 50 parts of guanylurea carbonate are worked up into a slurry and sufficient carbon dioxide, say 125 parts, added thereto to precipitate the calcium and to react with the guanylurea carbonate and give a guanylurea bicarbonate solution having a pH of about 8.0. The resulting slurry is mixed further in another mixing kettle and then filtered. The filtrate is evaporated at a temperature below 35° C., cooled and the crystalline precipitate, predominantly dicyandiamide contaminated with such small amounts of cyanamide as are present in the entrained liquor, recovered by filtration.

Example 2

Example 1 is repeated carrying out the evaporation step at a higher temperature which results in practically pure dicyandiamide being obtained. Thus, when evaporation is effected at a higher temperature in the range of about 60° to 80° C., or higher the cyanamide polymerizes yielding practically 100% dicyandiamide which precipitates out of solution and is readily separated by cooling and filtering. The filtrate comprising mother liquor containing guanylurea carbonate is recycled to form a new batch or slurry of calcium cyanamide.

Example 3

100 parts of crude calcium cyanamide are gradually fed into a 300 part mixture of wash water containing guanylurea carbonate and mother liquor containing guanylurea carbonate from a previous batch extraction. The slurry is fortified with about 1 part of guanylurea carbonate and 50 parts of carbon dioxide are simultaneously supplied while maintaining the pH at 8.4 and keeping the temperature below 35° C. The resulting slurry is passed to another mixing kettle and then filtered. About 275 parts of filtrate are obtained containing from 10% to 12% of cyanamide. The sludge on the filter is washed and the wash water recycled to form part of a new batch. Due to the low concentration of values in the filtrate, the latter is further evaporated under vacuum and below 35° C. until crystals begin to form whereupon the liquid is chilled and filtered. The yield is predominantly dicyandiamide, the cyanamide which first formed having polymerized to dicyandiamide, because of the increased pH. The filtrate is recycled to form the mother liquor for the next batch.

Example 4

A batch similar to that described in Example 3 is subjected to the same series of steps to obtain a corresponding 275 part filtrate. In order to obtain a practically complete conversion to dicyandiamide, the solution of cyanamide comprising the 275 part filtrate is evaporated at a temperature of about 70° C., although other temperatures can also be used up to boiling. An alkaline solution is formed by the evolution of $CO_2$ from the carrier solution. This results in a solution having a pH between 8.4 and 11.4, when the higher temperatures above given are used to accelerate the polymerization of the cyanamide to dicyandiamide. Since the latter is relatively insoluble in the cooled mother liquor, the dicyandiamide is readily separated by filtering the crystalline precipitate. The filtrate is then recycled to form another slurry of calcium cyanamide for subsequent extraction.

The extraction step of the process described in the preceding examples is preferably carried out at a pH of approximately 8.4. Various changes may, however, be made in the particular steps, thus for example, if stack gases are used as the source of carbon dioxide it may be preferable to strip the $CO_2$ from the stack gases with an aqueous solution of a carrier and thereafter admix the carrier solution with the slurry, thereby precipitating $CaCO_3$, the whole mixture being led directly into the first mixing tank.

A feature of this invention is the relatively complete control of the process and the relatively rapid initiation of the reaction obtained by the use of guanylurea or its carbonate or a similar $CO_2$ carrier.

When the above examples are repeated without the use of a $CO_2$ carrier substantially longer periods of time are required to effect the calcium precipitation. Also due to the lesser speed of absorption of $CO_2$ without the carrier, proportionately more $CO_2$ is required because more $CO_2$ passes through the slurry unabsorbed.

In the example given, $Na_2CO_3$, $K_2CO_3$, guanidine either as such or as its carbonate, guanylurea or an ethanolamine or alkyl amine can be used in place of guanylurea carbonate. In each instance dilute solutions of the respective carbon dioxide carriers of from 3% to 5% or even 10% strength fall in a desirable range.

What is claimed is:

1. A method of preparing dicyandiamide which includes slurrying calcium cyanamide in the presence of $CO_2$ and a substance chosen from the group consisting of guanylurea and guanylurea carbonate, in sufficient water to maintain all the dicyandiamide formed in solution, maintaining a pH between 7.0 and 12.0 and a temperature between 30° C. and boiling, whereby calcium cyanamide is converted to calcium carbonate and dicyandiamide, separating the calcium carbonate from the mother liquor and recovering the dicyandiamide from the latter.

2. A method of preparing dicyandiamide which includes slurrying calcium cyanamide in the presence of $CO_2$ and a substance chosen from the group consisting of guanylurea and guanylurea carbonate, in sufficient water to maintain all the dicyandiamide formed in solution, maintaining the pH between 7.0 and 12.0 and the temperature between 30° C. and boiling, separating out the calcium solids, recirculating the mother liquor therefrom with fresh additions of calcium cyanamide and $CO_2$, filtering out the solids with each recirculation until the mother liquor from the solids removal is just short of saturation with dicyandiamide, and removing the latter therefrom.

3. A method of preparing dicyandiamide which includes slurrying calcium cyanamide in the presence of $CO_2$ and guanylurea carbonate, with sufficient water to maintain all the dicyandiamide formed in solution, maintaining the pH between 7.0 and 12.0 and the temperature between 30° C. and boiling, filtering out the solids, recirculating the mother liquor with fresh additions of calcium cyanamide and $CO_2$ until the mother liquor from the solids removal is just short of saturation with dicyandiamide, and removing the latter therefrom.

4. The method of claim 3 with the additional step of recirculating the dicyandiamide mother liquor to the cycle.

JOHN L. OSBORNE.

REFERENCES CITED

The following references are of record in the file of this patent:

UNITED STATES PATENTS

| Number | Name | Date |
| --- | --- | --- |
| 2,337,448 | Osborne | Dec. 21, 1943 |